US010735292B1

(12) United States Patent
Klavon et al.

(10) Patent No.: US 10,735,292 B1
(45) Date of Patent: Aug. 4, 2020

(54) MONITORING INTERCONNECTIONS BETWEEN NETWORK DEVICES OF DIFFERENT NETWORK ENTITIES

(71) Applicant: Amazon Technologies, Inc., Seattle, WA (US)

(72) Inventors: Erik Klayton Klavon, San Francisco, CA (US); Po-Chun Chen, Oak Hill, VA (US); James Michael Lamanna, Seattle, WA (US); Halley Jagarapu, Herndon, VA (US); Jagan Selvarajah, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/365,608

(22) Filed: Mar. 26, 2019

(51) Int. Cl.

| | |
|---|---|
| ***H04L 12/701*** | (2013.01) |
| ***H04L 12/26*** | (2006.01) |
| ***H04L 12/46*** | (2006.01) |
| ***H04L 12/741*** | (2013.01) |
| ***H04L 12/813*** | (2013.01) |
| ***H04L 12/825*** | (2013.01) |

(52) U.S. Cl.
CPC ...... *H04L 43/0882* (2013.01); *H04L 12/4645* (2013.01); *H04L 43/12* (2013.01); *H04L 43/16* (2013.01); *H04L 45/745* (2013.01); *H04L 47/20* (2013.01); *H04L 47/25* (2013.01)

(58) Field of Classification Search
None
See application file for complete search history.

(56) References Cited

U.S. PATENT DOCUMENTS

2013/0070585 A1* 3/2013 Takasaki .............. H04Q 1/0478 370/225

* cited by examiner

*Primary Examiner* — Ayanah S George
(74) *Attorney, Agent, or Firm* — Klarquist Sparkman, LLP

(57) ABSTRACT

A physical interconnect having multiple virtual paths is coupled between network devices of independent networks operated by different entities. In one aspect, the interconnect is monitored so that the entities can simultaneously and separately monitor network traffic being exchanged across the interconnect. Each entity can be assigned two virtual paths through the interconnect to pass network traffic through their network device, over the interconnect, through a network device of the other entity, back over the interconnect link and back through their network device. The network devices can be configured to loop back network packets using a variety of loopback configurations. Hardware policers that monitor capacity usage of the virtual paths can also be tested.

20 Claims, 9 Drawing Sheets

MONITORING INTERCONNECTIONS BETWEEN NETWORK DEVICES OF DIFFERENT NETWORK ENTITIES

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Typically, users connect to a cloud provider via the Internet. However, more recently, customers can also connect from their on-premise network over a private, dedicated connection that in some cases is facilitated by a so-called third-party connectivity provider (also called a partner provider). Thus, a dedicated network connection is established between the customer premises and the cloud provider, which allows faster speeds, lower latencies, lower network costs, and higher security. Using, for example, industry standard 802.1q VLANs, this dedicated connection can be partitioned into multiple virtual interfaces. This allows customers to use the same connection to access public resources, such as objects stored in the cloud using public IP address space, and private resources, such as instances running within a virtual private IP space, while maintaining network separation between the public and private environments.

Improvements need to be made in the area of testing dedicated interfaces between a third-party connectivity provider and a cloud provider.

DETAILED DESCRIPTION

A physical interconnect (e.g., a cable) having multiple virtual paths is coupled between network devices of independent networks operated by different network providers.

In one aspect, the interconnect is monitored so that the network providers can simultaneously and separately monitor that network traffic is being correctly exchanged across the interconnect. Each network provider can be assigned two or more virtual paths through the interconnect to pass test packets through their network device, over the interconnect, through a network device of the other network provider, back over the interconnect link and back through their network device. The network devices can be configured to loop back the test packets using a variety of loopback configurations. Hardware policers that monitor capacity usage of the virtual paths can also be tested.

Figure 1:
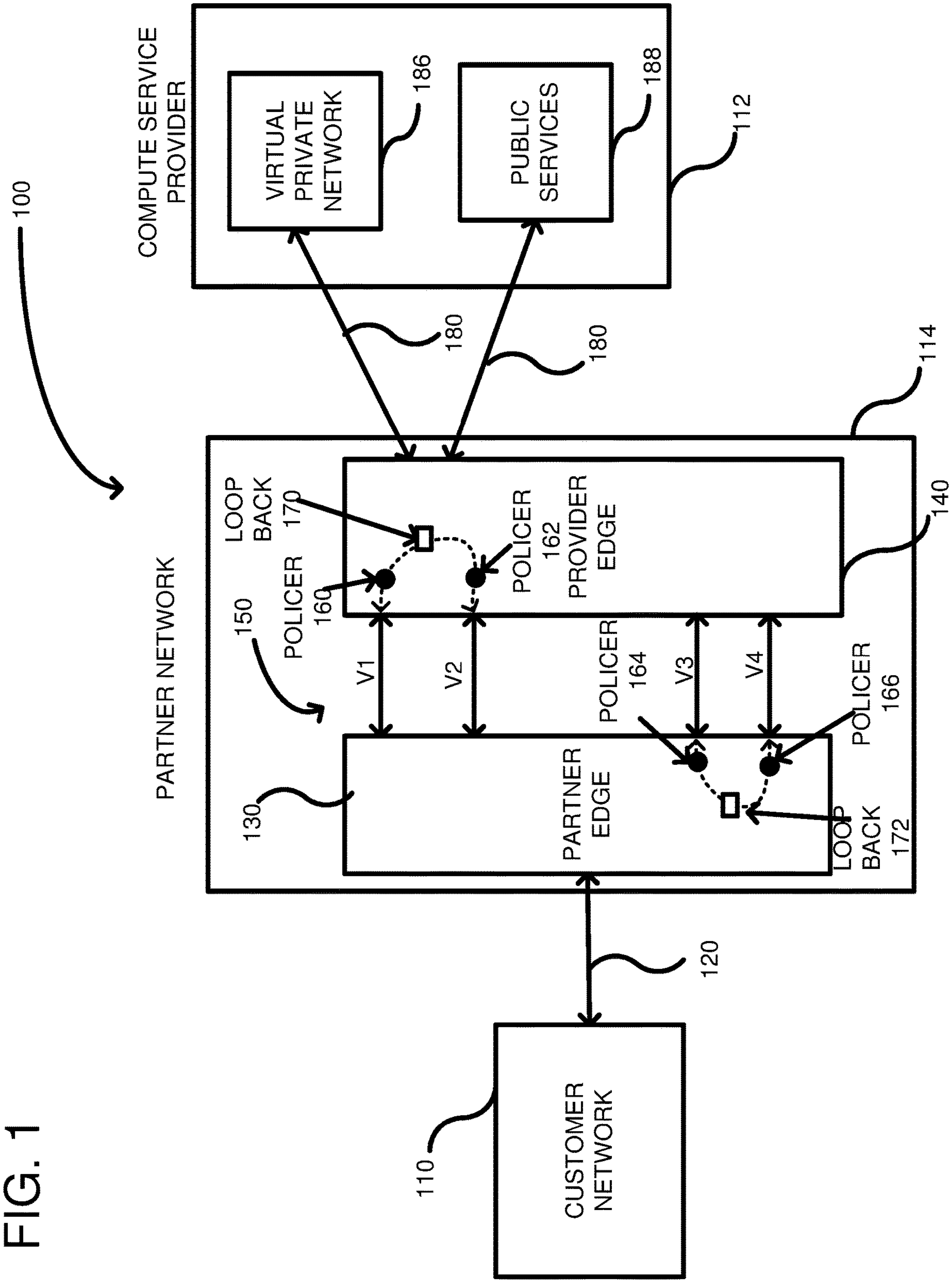
FIG. 1 shows an embodiment of a system for testing an interconnect between a partner edge's router and a compute service provider's edge router using a loopback mechanism.

FIG. 1 is a system 100 according to one embodiment wherein an interconnect having multiple virtual lines is tested using a loopback mechanism. The system 100 includes a customer network 110, a compute service provider network 112 and a partner network 114 positioned between the customer network 110 and the compute service provider network 112. The system 100 allows direct connection via dedicated cabling between the customer network 110 and the compute service provider 112 without the use of publicly exposed servers, such as those used in association with the Internet. In particular, third-party companies (called partners) allow for the physical coupling between the customer network 110 and the compute service provider 112. The partner network 114 can be located within a same physical building as the customer network 110 or it can be in a different location. Whatever the case, a dedicated cable or cables 120 connect the customer network 110 and the partner network 114. A network circuit can also connect the customer network 110 and the partner network 114. The network circuit can include a variety of options that exclude publicly exposed servers, such as a layer 1 wave, or a layer 2 Ethernet circuit. In any event, the network circuit generally includes a cable plus intermediate amplification of the transmissions. The cable 120 can be connected to an edge router 130, which is under the control of the partner network 114. The edge router 130 can be coupled to a compute service provider edge router 140 via an interconnect, shown generally at 150. The interconnect 150 and the provider edge router 140 are typically within a same building. The interconnect 150 can be a single cable or a network circuit, but is divided into multiple virtual paths, such as is indicated by V1-V4. Although a single interconnect 150 is shown, multiple interconnects can couple together the edge router 130 and edge router 140. Each virtual path can have its own capacity and various types of network traffic can be assigned to different ones of the virtual paths. In the illustrated example, various virtual paths V1-V4 are dedicated paths used for testing the interconnect 150. Each virtual path includes a policer, such as is shown at 160, 162, 164 and 166. More particularly, the policer 160 is assigned to the virtual path V1 and is used to determine whether the capacity of the network traffic on V1 is within a predefined limit. Packets that exceed the capacity of the virtual path can be dropped by the policer. If the network traffic is within the capacity limits, then the policer 160 transmits the packet to a loopback mechanism 170. As further described below, the loopback mechanism 170 can detect that the packet is a test packet and re-direct the test packet back to the same interconnect, but on a different virtual path V2. Before being transmitted on the virtual path V2, the policer 162 checks the usage of V2 to ensure that it is within a predefined capacity. It should be noted, the capacity of the policer 160 can be different from the capacity of the policer 162 or it can be the same. In any case, the packet is transmitted back towards the router 130 of the partner to check whether the interconnect 150, including the policers, are operating properly. The opposite direction can also be tested in a similar fashion. For example, packets can be provided from the edge router 140 towards the partner edge router 130 via a virtual path V3. The packet can pass through a policer 164 that checks the capacity of the virtual path V3 to determine that it is within predefined limits. If so, the policer 164 passes the packet to a loopback mechanism 172, which detects that the packet is a test packet and transmits the packet back on the same interconnect 150, but on a different virtual path, V4. Before transmission, the packet passes through a policer 166 that determines whether the capacity is exceeded on the virtual path V4. On any of the policers 160, 162, 164 and 166, if the capacity of the virtual path is exceeded then the packets are dropped. Otherwise, the packets are transmitted across the interconnect.

During this process of testing the interconnect 150, the packets are not transmitted on a public network such as the Internet. Instead the packets are within the domain of the partner network 114 on dedicated cables. Likewise, cables 180 from the provider edge 140 to the compute service provider network 112 are dedicated cables that do not pass through public networks. Although not shown, the interconnect 150 also has virtual paths for handling regular customer traffic, such as traffic from the customer network 110 to the compute service provider 112. Different virtual paths can be used within the interconnect to communicate with a private virtual network 186 and a public network 188. As described further below, virtual machines can be executing within the compute service provider 112 in order to send and receive the test packets over the partner network 114.

Multiple techniques can be used as the loopback mechanisms 170, 172. In a first embodiment, tag re-writing can be used. More specifically, an encapsulation mechanism (e.g., pseudo-wires, GRE tunnels, etc.) can be used to insert a tag into a packet. The tag can identify a particular virtual path, such as V1, that the packet should be transmitted upon. In one example, an Ethernet frame is sent out of a same interface through which it was received, with the only difference between the transmitted and received frames being the tag. The loopback can be implemented in layer 2 hardware. Generally, layer 2 relates to Ethernet frames, while layer 3 relates to packets. Nonetheless, for simplicity, the description herein refers to packets generically as covering both layer 2 frames and layer 3 packets.

In a second embodiment, the loopback mechanism can be accomplished using layer 3 hardware. For example, different IPV4 and IPV6 blocks can be assigned for each VLAN being monitored. Layer 3 interfaces can be established for each monitoring VLAN in a pair, and these interfaces can be placed in a dedicated forwarding table so that traffic sourced from an address on one virtual path and destined for an address on another virtual path is routed between the two layer 3 interfaces.

In yet another embodiment, an external loop can be used. Two physical interfaces on a network device can be used to implement the loopback mechanism by interconnecting the interfaces using a cable to establish an Ethernet link between them. One of these interfaces is configured as untagged and the other is monitoring VLANs in a pair. Spanning tree and other network protocols can be configured to enable traffic to pass from one VLAN to another over the Ethernet link. An additional network device can also be placed between the two interfaces to facilitate the exchange of network traffic.

Figure 2:
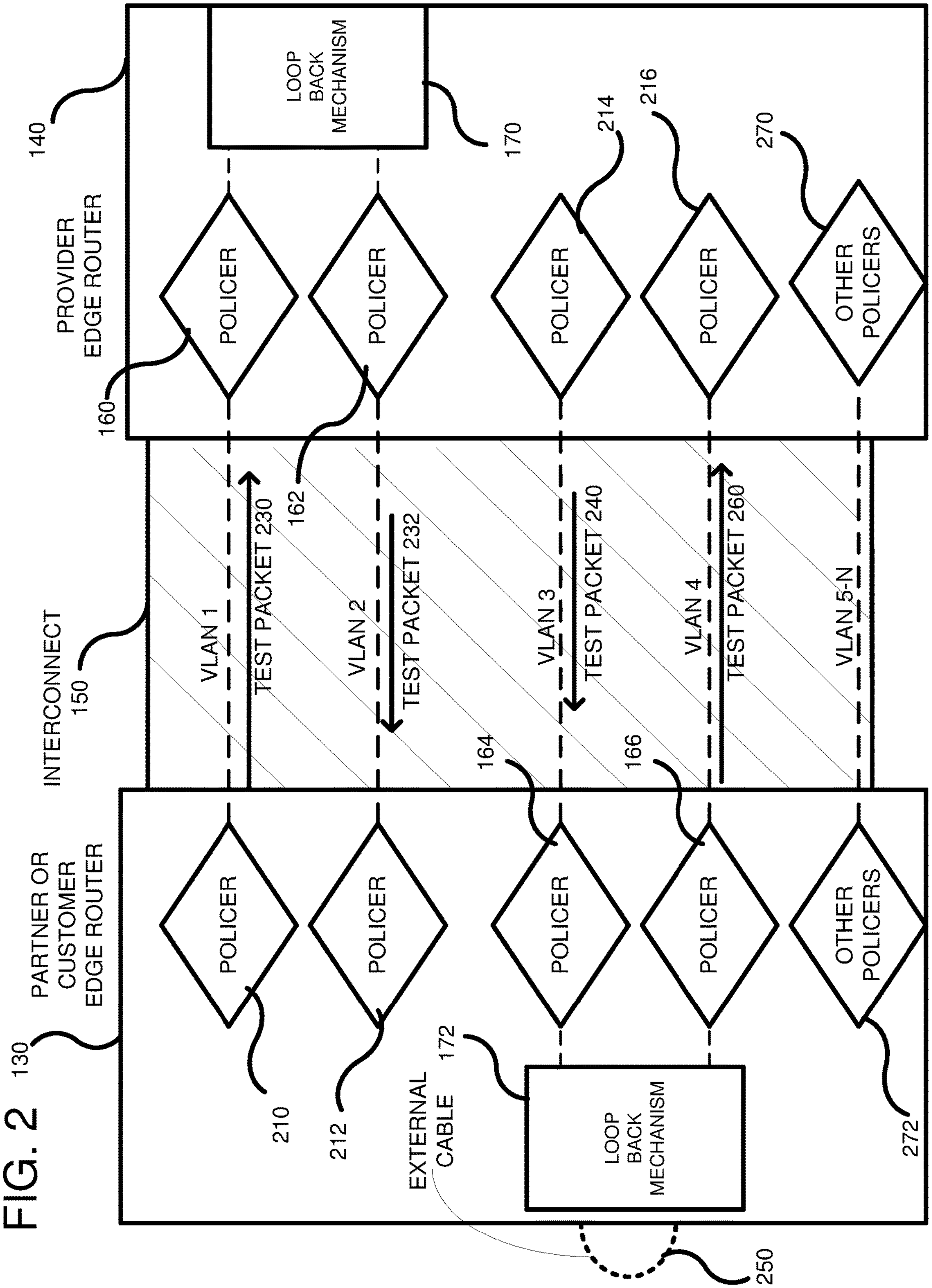
FIG. 2 shows further details of the loopback mechanism of FIG. 1.

FIG. 2 shows further details of the partner customer router 130 and the compute service provider router 140. As can be seen, the interconnect 150 includes multiple virtual paths labeled as VLAN 1-N (where N is any integer number). VLAN 1 and VLAN 2 are used to test the interconnect 150 and router 140, while VLAN 3 and VLAN 4 are used to test the interconnect 150 and router 130, as further described below. VLAN 5-N can be used for normal network traffic. A test packet 230 is sent from the partner router 130 towards the provider router 140 using VLAN 1. A policer 210 within the partner router can ensure that VLAN 1 has a proper capacity level as viewed from the partner router 130. The test packet 230 can be generated by a server computer (not shown) in the partner network 114 (FIG. 1). Once received in the provider router 140, a check can be performed in the policer 160 that the capacity of the VLAN 1 is not exceeded. If the capacity is exceeded, then the packet can be dropped. Otherwise, the packet is passed to the loopback mechanism 170, which transmits the packet back on the interconnect 150 via the policer 162, which checks the capacity of VLAN2 before sending. The policer 162 then sends the packet back over VLAN 2, as shown by test packet 232, which can be the same as test packet 230 or with portions re-written. Once received in policer 212, the capacity of VLAN2 is checked again using the partner router 130. The packet 232 can then be analyzed by the partner software for latency (as compared to when test packet 230 was sent), and also for ensuring that the policers 160, 162, 210, 212 operating properly. As described further below, the loopback 170 can be any of the mechanisms described herein and the testing can include ensuring that the loopback mechanism 170 is operating properly. In some examples, the number of test packets can be increased until the capacity of VLAN 1 and VLAN 2 is exceeded so as to test whether the packets are dropped by the policers.

Testing of the router 130 can also be performed through the injection of test packets by the router 140. For example, a test packet can pass policer 214 that ensures traffic on VLAN 3 is below a predetermined capacity. The test packet, shown at 240, is transmitted on VLAN 3 of the interconnect 150 and is received by the policer 164, which checks that the capacity of VLAN 3 is not exceeded, and passes the packet to the loopback mechanism 172. The loopback mechanism 172 can include an external cable 250 that uses two ports on the router 130. The other loopback mechanisms described herein can also be used, such that the external cable is not needed. Once the test packet 240 passes through the loopback mechanism 172, it is passed to the policer 166 that checks the capacity of VLAN 4 and, if the capacity is not exceeded (according to the partner router), transmits the packet as shown at 260. A policer 216 can then check that the capacity of VLAN 4 is not exceeded (according to the provider router) and, if not, pass the packet to a server computer (not shown) for processing. The processing can include checking to ensure that all policers 164, 166, 214, 216 worked properly as well as the loopback mechanism 172. Further, timing can be analyzed, such as latency.

Other network traffic can pass through policers 270, 272 and VLANs 5-N, wherein each VLAN can have policers on opposing sides of the interconnect 150. Thus, a compute service provider can pass test packets through its own router 140 so as to test the interconnect 150 and policers on a partner or customer router 130. Likewise, a partner or customer can pass test packets through its own router 130 so as to test the interconnect 150 and policers on a compute service provider router 140. The interconnect 150 is a single cable that is divided into N VLANs and a portion of the VLANs can be dedicated to testing. Additionally, the testing can be accomplished by either business entity or both business entities on opposing sides of the interconnect 150.

Figure 3:
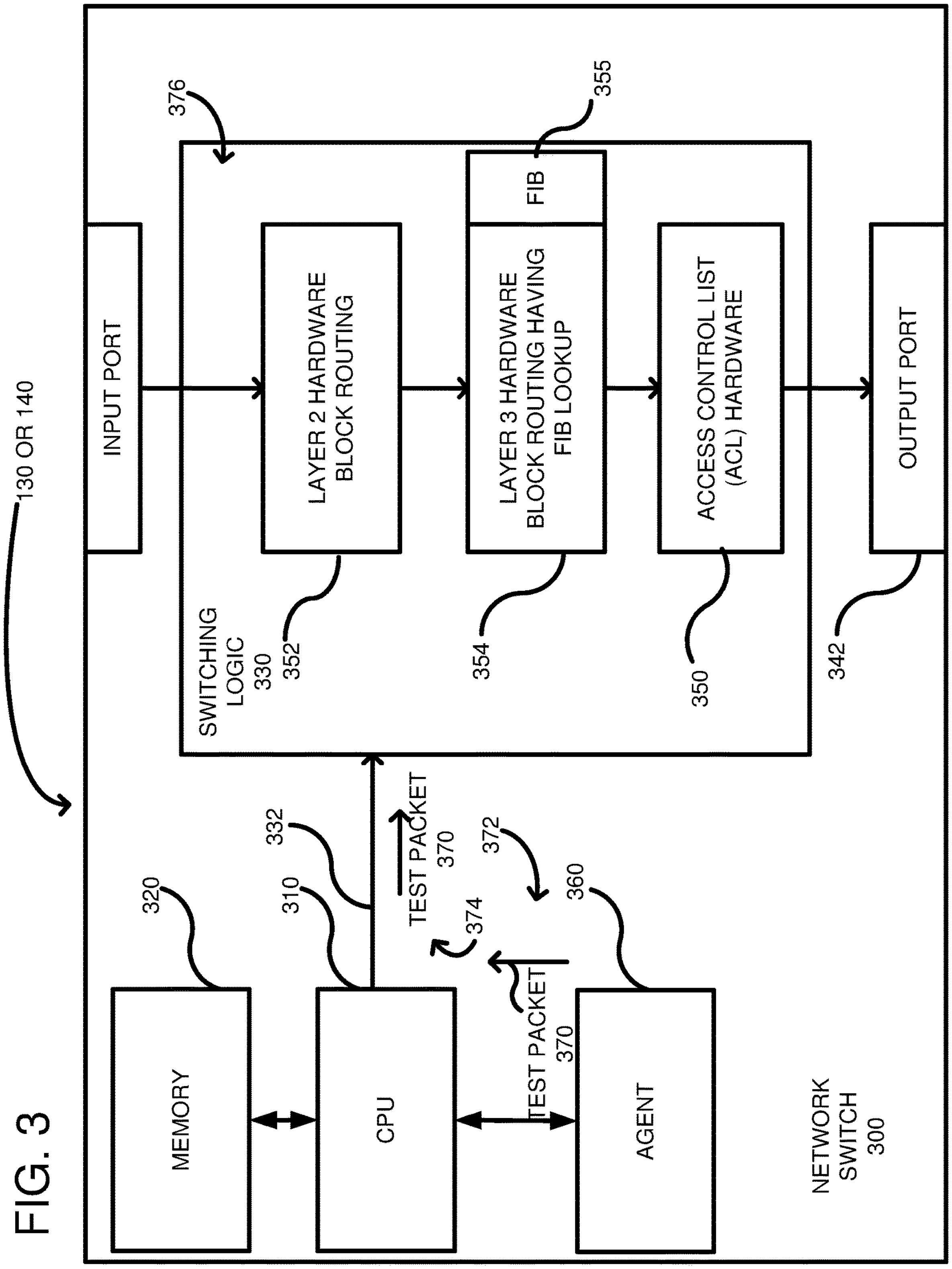
FIG. 3 shows a network switch that can include a loopback mechanism according to FIG. 1.
Figure 5:
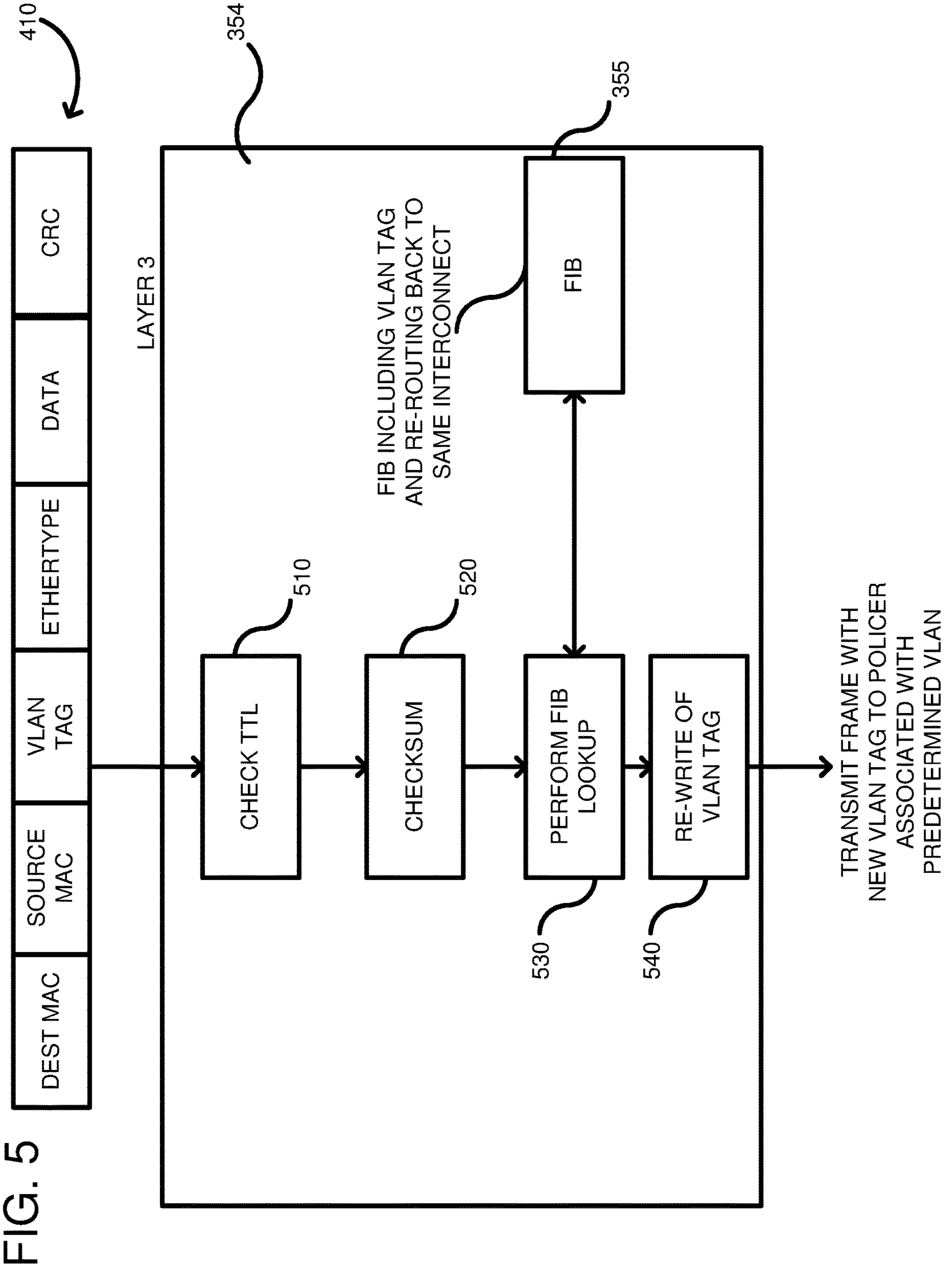
FIG. 5 shows a layer 3 loopback mechanism of the switch of FIG. 3, according to another embodiment.

FIG. 3 shows a detailed example of an embodiment of the network device 130 or 140. The network device is a switch that routes packets to a next hop in the network using a destination IP address. A CPU 310 is coupled to a memory 320 and to switching logic 330 through a bus 332 (PCIe or other protocols and bus types can be used). The switching logic 330 is positioned between an input port 340 and an output port 342, which are typically adapted to receive network cables, such as Ethernet cables. The switching logic 330 can be a single ASIC integrated circuit or divided into multiple integrated circuits. The switching logic 330 can include multiple different hardware logic blocks including a Layer 2 hardware block 352, a Layer 3 hardware block 354, and an Access Control List (ACL) hardware block 350. The layer 2 hardware block 352 relates to an Ethernet layer and can forward packets based on MAC tables. Further details of exemplary layer 2 hardware is shown in FIG. 3. The layer 3 hardware block 354 relates to forwarding based on a longest prefix match of an IP address. Layer 3 typically involves a route lookup, decrementing the Time-To-Live (TTL) count, calculating a checksum, and forwarding the packet with the appropriate MAC header to the correct output port. The route lookup of the layer 3 hardware can include searching within a Forwarding Information Base (FIB) 355, which includes destination addresses for packets being transmitted through the switching logic. Exemplary layer 3 hardware is shown in FIG. 5. The network device can run routing protocols, such as an Open Shortest Path First (OSPF) or a Routing Information Protocol (RIP), to communicate with other Layer 3 switches or routers. The routing tables are used to lookup the route for an incoming packet. The ACL block 350 relates to permissions and can include rules whether to drop packets. The different hardware blocks can be coupled in series and additional hardware blocks can be added based on the design. Packets pass from the input port 340 to the output port in accordance with the configuration of the hardware logic blocks 350, 352, 354. Although only a single input and output port are shown, usually there are multiple ports on the switch.

As shown, an agent 360 can execute on the CPU 310 and can be used to control testing of one or more network devices using one or more test packets 370. As shown at 372, the agent 360 passes the test packets 370 to the CPU hardware 310 for transmitting the test packets to the switching logic 330 via the bus 332 (as shown at 374). The test packets are then injected into an input pipeline of the switching logic (such as via the CPU port), such that it passes into Layer 2 hardware 352, Layer 3 hardware 354 and the ACL hardware 350. The test packets 370 include an appropriate MAC address that matches a MAC address of the network device so that L3 switching occurs. Specifically, the probe includes a layer 2 header wherein the destination MAC address equals a MAC address of the network device. The layer 2 hardware 352 performs a lookup on the test packet and modifies the layer 2 header so that the destination MAC equals a MAC address of the opposing network device using layer 2 MAC tables (not shown). The test packet 370 also includes a destination address that is an IP address within the Layer 3 lookup tables (the FIB 355). More particularly, the layer 3 hardware 354 performs a lookup on a prefix of the test packet 370 and determines a proper output port 342 that directs the test packet 370 towards the network device on the opposite side of the interconnect (see FIG. 1). Alternatively, the test packet 370 can have the full IP destination address (which includes the prefix) for lookup in the layer 3 hardware 354. In either case, the agent 360 ensures that the test packet 370 includes a destination address that is found in the FIB. The input port 340, output port 342 and switching logic 330 can be considered a data plane of the network device. By contrast, the CPU 310, memory 320, and agent 360 are considered part of a control plane.

Instead of the test packets being generated by the agent 360, the test packets can be generated by an external server computer, such as a server computer executing one or more virtual machines that transmit the test packets, receive the test packets in return, and perform analysis on latency and other aspects to ensure the network devices and interconnect are functioning properly. An example of such virtual machines are described further below in relation to FIG. 6.

Figure 4:
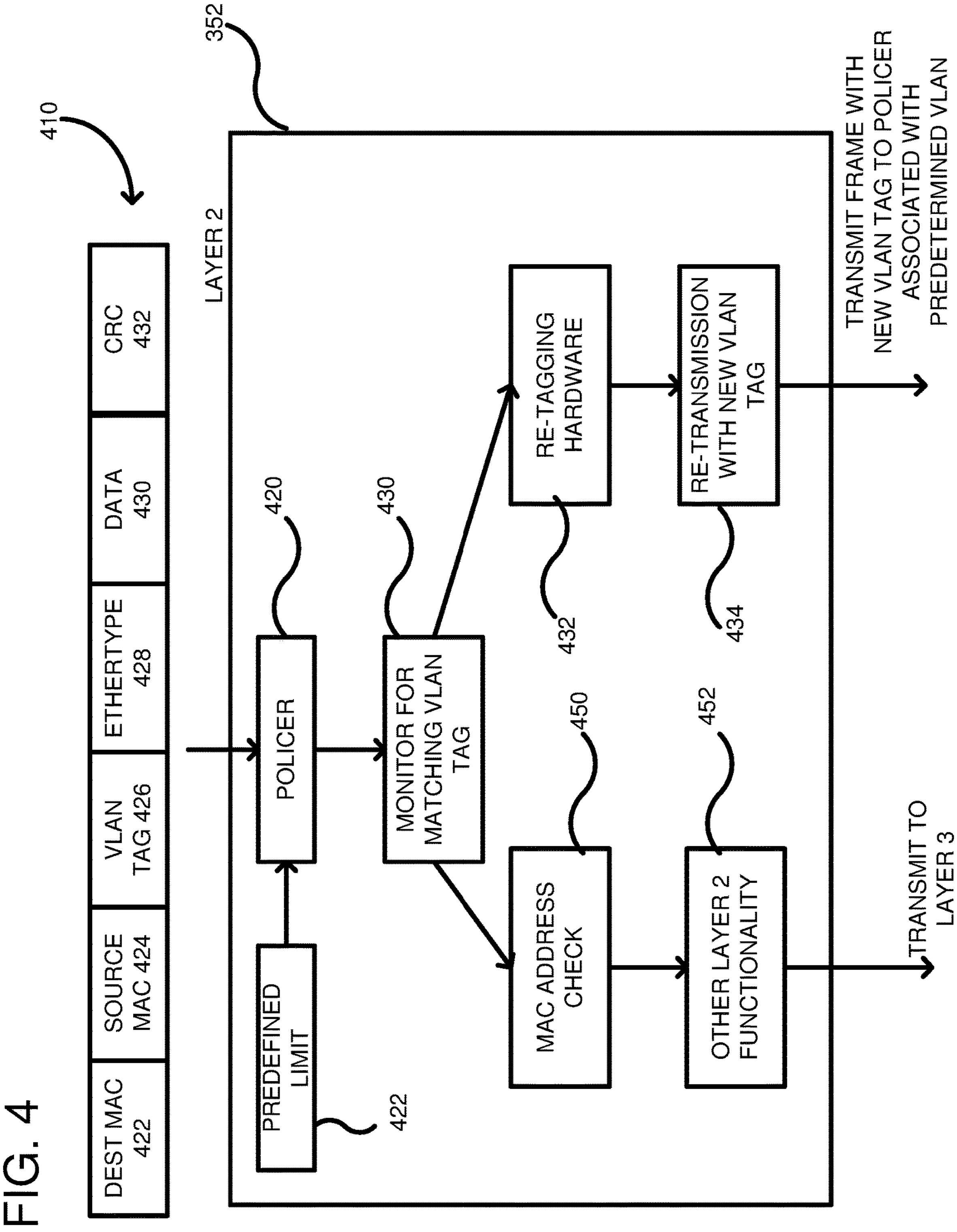
FIG. 4 shows a layer 2 loopback mechanism of the switch of FIG. 3, according to one embodiment.

FIG. 4 shows an example of Layer 2 hardware 352. In this case, Layer 2 is used as the loopback mechanism 170 (see FIG. 1) and the policer, such as policer 160 (FIG. 1). An Ethernet packet is shown at 410, although other protocols can be used. The packet 410 includes a number of fields including a destination MAC address field 422, a source MAC address field 424, a VLAN tag field 426, an Ethertype field 428, a data field 430 and a CRC field 432. The destination MAC address field 422 is typically a MAC address of the receiving network device. The source MAC address field 424 is an address of the sender of the packet. The VLAN tag field 426 is used to identify one of the VLANs in the interconnect. The Ethertype field 428 is used to identify a protocol associated with the packet. The data 430 includes the data and the CRC 432 includes information for checking the packet's integrity.

The layer 2 hardware 352 receives the packet 410 in a policer 420 that monitors network capacity against a predefined limit 422. Thus, the policer 420 can keep track of a number of packets over a window period of time to determine if a capacity of a VLAN identified by the VLAN tag 426 is below a predefined limit 422. If the network traffic on the VLAN exceeds the capacity of the VLAN, then the policer 420 drops the Ethernet packet 410. Otherwise, the policer 420 can pass the packet to hardware block 430, which monitors for a matching VLAN tag. As part of the monitoring, the layer 2 hardware can decapsulate the packet 410 so as to be able to read the individual fields, including the VLAN tag. If the VLAN tag is a predetermined tag used for testing, then the monitoring hardware 430 sends the packet to re-tagging hardware 432, which re-writes the VLAN tag with the appropriate VLAN testing pair. Such re-writing can include re-encapsulation. For example, turning to FIG. 1, a VLAN tag for VLAN 1 can be re-written as VLAN 2 so that the test packet can pass through the loopback mechanism 170. Likewise, VLAN tags for VLAN 3 can be rewritten to VLAN 4 to test loopback mechanism 172. At block 434, the Ethernet packet is re-transmitted towards the complementary VLAN. The re-written Ethernet packet with the updated VLAN tag can go through another policer (not shown), which can also be part of the layer 2 hardware 352.

If the monitoring hardware 430 does not match a VLAN tag, then it determines that the packet is normal network traffic. In such a case, the layer 2 hardware can perform a MAC address check 450, and other layer 2 functionality 452, such as re-writing the MAC address so that the source is the network switch. The packet can then be forwarded to layer 3 for further switching. In one aspect, for both test packets and normal traffic, the data plane of the network switch is used and the control plane need not be involved.

FIG. 5 shows an alternative wherein Layer 3 354 is used as the loopback mechanism 170 (see FIG. 1). The policer, such as policer 160 (FIG. 1), can be a separate hardware component. The layer 3 hardware 354 can include various hardware blocks, such as check time-to-live (TTL) parameter 510, and a check of the checksum 520 associated with the Ethernet packet. The TTL parameter can be checked whether it has reached zero and, if so, a failure is reported. Conversely, if the TTL is greater than zero, it is decremented and forwarded as part of the packet. The checksum hardware 520 performs a mathematical calculation on the Ethernet packet to confirm the integrity of the packet. At hardware block 530, a look up is performed of a forwarding information base table 355 using the VLAN tag as part of the Lookup. If the VLAN tag indicates that the Ethernet packet was received on a test first VLAN path, then block 540 rewrites the Ethernet packet with a new VLAN tag associated with a second VLAN path used for testing in cooperation with the first VLAN path. The updated Ethernet packet can be transmitted to the second VLAN path via a policer.

Thus, FIGS. 4 and 5 show that the loopback mechanism can be implemented in multiple ways for transmitting a packet from a source network device on an interconnect to a destination network device, through a loopback mechanism, and back to the interconnect for transmission back to the source network device. Thus, the interconnect between two network devices can be tested as well as policers associated with VLANs that are part of the interconnect.

Figure 6:
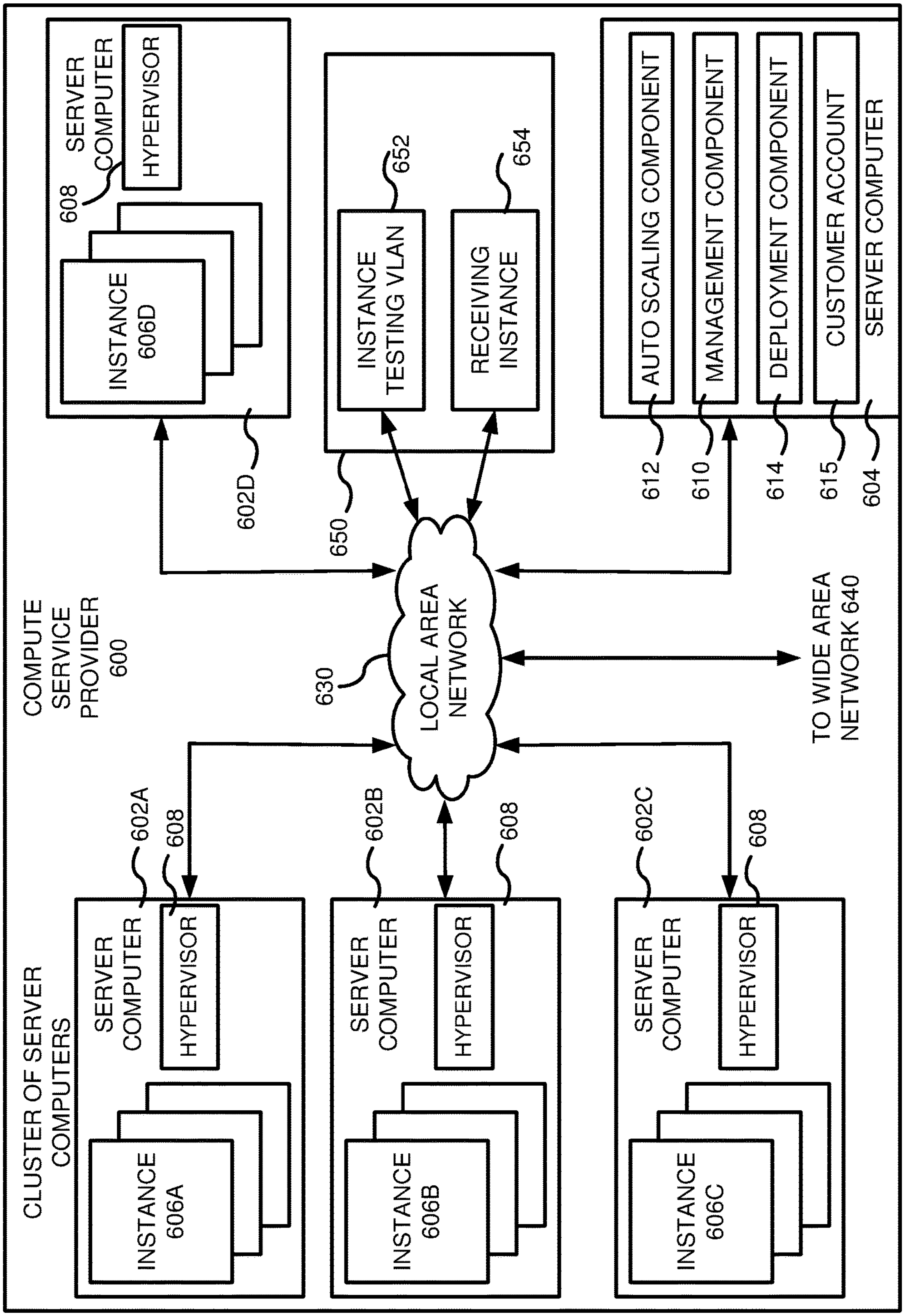
FIG. 6 is an example system diagram showing a plurality of virtual machine instances running in the multi-tenant environment, with several virtual machines assisting in loopback testing associated with FIGS. 1-5.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

A testing server computer 650 can be used to test the interconnects described above. For example, the testing server computer can include instances 652, 654 running in a private network, such as is shown at 186 in FIG. 1. The instance 652 can transmit a testing packet, which is received by router 140 and transmitted as test packet 240 (FIG. 2). The loopback mechanism 172 can then transmit test packet 260 back to router 140, which can then forward the packet to the receiving instance 654. The virtual machines 652, 654 can cooperate so as to analyze a difference in time when packets were transmitted and received so as to determine latency. Additionally, counts can be used to determine how many packets were dropped. Moreover, the instance 652 can inject extra packets that exceed limits on the various policers to see that the policers drop the packets.

Figure 7:
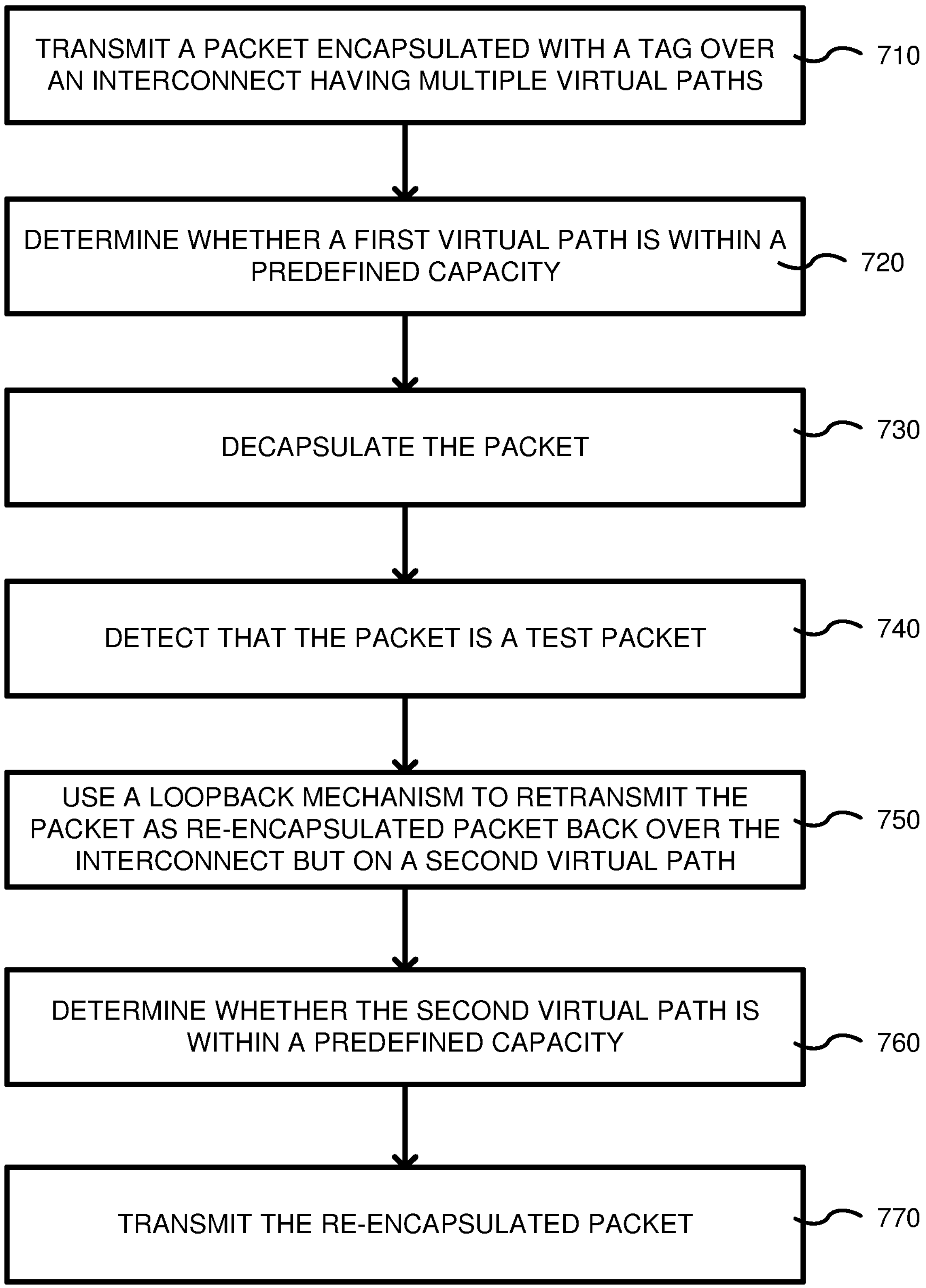
FIG. 7 is a flowchart of a method for testing an interconnect according to one embodiment.

FIG. 7 is a flowchart according to one embodiment for monitoring and testing an interconnect. In process block 710, a packet encapsulated with a tag is transmitted over an interconnect having multiple virtual paths. For example, in FIG. 2, the interconnect 150 has N virtual paths, each of which has a separate capacity limit and which are treated as separate cables, despite being within a single cable. In FIG. 4, a packet 410 is encapsulated with a VLAN tag 426. As shown in FIG. 2, the packet can be test packet 230 transmitted on VLAN 1. In process block 720, a determination is made whether a first virtual path is within a predefined capacity. For example, in FIG. 2, a policer 160 can be used to check the capacity of VLAN 1. As shown in FIG. 4, the predefined limit 422 can be hardcoded within the layer 2 hardware. In process block 730, the packet can be decapsulated, which includes unpacking the packet into its individual fields. In process block 740, a detection can be made that the packet is a test packet. For example, returning to FIG. 4, the detection can occur using hardware 430 which compares the VLAN tag Field 426 to a predetermined number. In the case of a match, the packet 410 is associated with a test packet. In process block 750, a loopback mechanism is used to retransmit the packet as a re-encapsulated packet back over the interconnect on a different virtual path from which it was received. For example, returning to FIG. 2, the test packet 232 can be retransmitted on VLAN 2 using loopback mechanism 170. FIG. 4 shows that the re-encapsulation can occur in hardware 432. In process block 760, a determination is made whether the 2$^{nd}$ virtual path is within a predefined capacity. For example, returning to FIG. 2, the policer 162 can check whether the capacity of VLAN 2 is within a predefined limit. If so, in process block 770, the packet is transmitted as a re-encapsulated packet. In some embodiments, the re-encapsulated packet can have a modified VLAN tag. In particular, the VLAN tag was changed from being associated with VLAN 1 to being associated with VLAN 2.

In some embodiments, when instances, such as instances 652 and 654 of FIG. 6, transmit and receive the test packets, then the two instances 652, 654 can communicate to determine a latency of a network path that can include transmissions from one of the instances 652, through the provider edge 140, through the partner edge 130, back through the provider edge 140 and to the other instance 654. Jitter can also be determined, which includes how latency changes over time.

Figure 8:
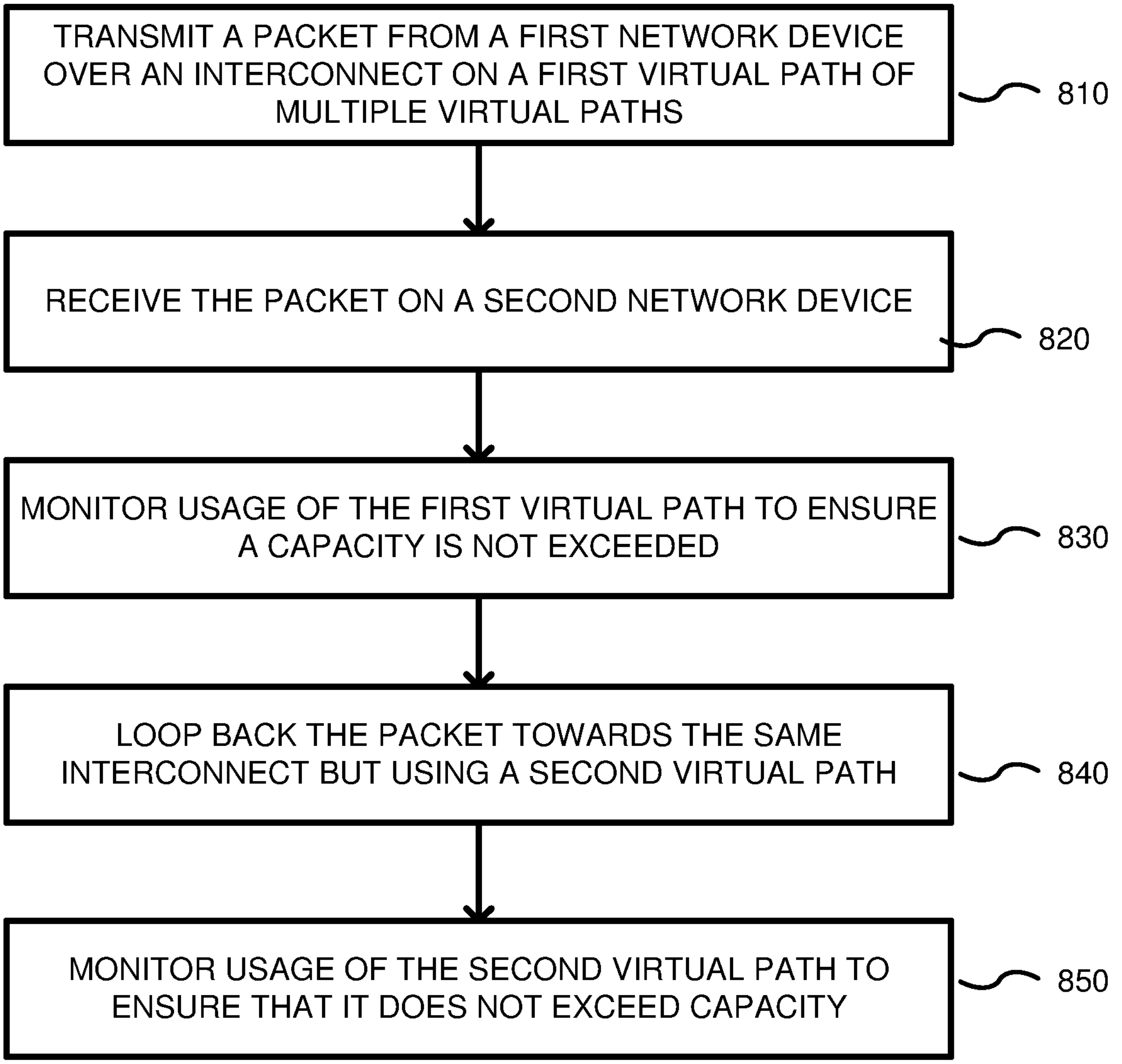
FIG. 8 is a flowchart of a method for testing an interconnect according to another embodiment.

FIG. 8 is a flowchart according to another embodiment for testing an interconnect. In process block 810, a packet is transmitted from a first network device over an interconnect on a first virtual path of multiple virtual paths. For example, returning to FIG. 2, the interconnect 150 includes VLAN 1-N, where N is any integer value. Each VLAN acts as a separate cable with its own individual policers. An example packet transmitted over VLAN 1 is shown at 230 and is transmitted from the network device 130. In process block 820, the packet is received on a 2$^{nd}$ network device. For example, returning to FIG. 2, the test packet 230 is received on network device 140. It should be noted, that network device 130 is owned or under control by a different business entity than network device 140. In process block 830, usage of the first virtual path is monitored to ensure a capacity is not exceeded. For example, in FIG. 2, the policer 160 can check the network traffic on VLAN 1 over a predetermined time period so as to determine whether a capacity of VLAN 1 has been exceeded. In process block 840, the packet is looped back towards the same interconnect using a different virtual path. For example, in FIG. 2, the loopback mechanism 170 can be used to transmit the packet towards VLAN 2, a second virtual path in the interconnect. In process block 850, the usage of the second virtual path is monitored to ensure that it does not exceed its capacity. Such monitoring can occur in the policer 162.

Thus, in some embodiments, the network device or the instances of FIG. 6 can monitor the interconnect by receiving Ethernet packets tagged for the inbound monitoring VLAN from the Interconnect; the network device can police all received Ethernet packets tagged for the inbound monitoring VLAN via the associated policer for that VLAN; the network device can decapsulate all received Ethernet packets tagged for the inbound monitoring VLAN not dropped by the associated policer and containing IPv4 or IPv6 packets; all decapsulated IPv4 or IPv6 packets received via the inbound monitoring VLAN can be re-encapsulated in outbound Ethernet packets tagged for the outbound monitoring VLAN; the outbound Ethernet packets tagged for the outbound monitoring VLAN can be policed via the associated policer for that VLAN; all outbound Ethernet packets tagged for the outbound monitoring VLAN not dropped by the associated policer are transmitted on the Interconnect.

Figure 9:
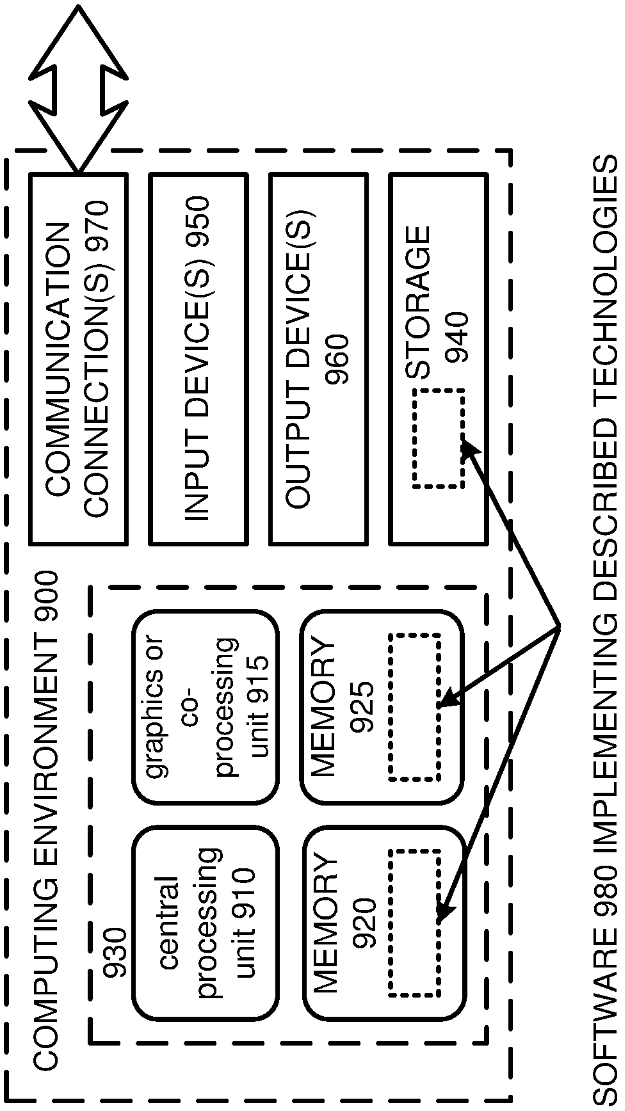
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory

920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of monitoring an interconnect having multiple virtual paths in a dedicated network connection, the method comprising:

transmitting a packet, encapsulated with a first tag, on the interconnect and from a first edge router to a second edge router, wherein the first tag identifies a first virtual path of the multiple virtual paths;

in the second edge router, determining that the first virtual path is within a first predefined capacity using a first traffic policer;

in the second edge router, decapsulating the encapsulated packet;

detecting that the packet is a test packet using the first tag;

using a loopback mechanism to retransmit the packet back on the interconnect as a re-encapsulated packet using a second tag, wherein the second tag identifies a second virtual path of the multiple virtual paths;

in the second edge router, determining whether the second virtual path is within a second, predefined capacity using a second traffic policer; and transmitting the re-encapsulated packet from the second edge router on the second virtual path of the physical interconnect back to the first edge router.

2. The method of claim 1, further including transmitting the packet from a first virtual machine of a compute service provider to the first edge router of the compute service provider.

3. The method of claim 2, further including receiving the re-encapsulated packet in a second virtual machine of the compute service provider and communicating between the first virtual machine and the second virtual machine to determine a latency of a network path between the first virtual machine and the second virtual machine.

4. The method of claim 1, wherein the packet is a first packet and further including transmitting a second packet from the second edge router over a third virtual path to the first edge router and receiving back the second packet from the first edge router on a fourth virtual path.

5. The method of claim 1, wherein the loopback mechanism is performed in layer 2 hardware of the second-edge router.

6. The method of claim 1, wherein the loopback mechanism is performed in layer 3 hardware using the first tag as part of a lookup in a forwarding table and wherein the second virtual path is determined based on the lookup.

7. A method, comprising:

receiving a packet from a first network device on a first virtual path of a physical interface, the packet being received in a second network device;

monitoring usage of the first virtual path using a first hardware policer on the second network device to ensure a capacity of the first virtual path is not exceeded;

looping the packet back from the second network device towards the physical interconnect using a second virtual path;

monitoring usage of the second virtual path using a second hardware policer on the second virtual path to ensure it does not exceed a capacity associated with the second virtual path; and transmitting the packet on the second virtual path back to the first network device.

8. The method of claim 7, wherein the first network device is part of a compute service provider and the second network device is outside of the compute service provider.

9. The method of claim 7, wherein the looping the packet back includes transmitting the packet from a first port on the second network device, through an external cable, to a second port on the second network device.

10. The method of claim 7, further including encapsulating the packet using a first tag and further including replacing the first tag with a second tag using the second network device, the second tag being used internally within the second network device to loop the packet hack to the second virtual path.

11. The method of claim 7, wherein the looping the packet back includes using layer 2 hardware to identify the packet as a test packet and passing the packet to the second hardware policer without performing a layer 3 lookup.

12. The method of claim 7, wherein the looping the packet back includes using layer 3 hardware that performs a lookup in a forwarding table to determine that the packet is to be transmitted on the second virtual path.

13. The method of claim 7, wherein the packet is a first packet and further including transmitting a second packet from the second network device to the first network device using a third virtual path in the physical interconnect, performing a loop back in the first network device and transmitting the packet from the first network device to the second network device on a fourth virtual path in the physical interconnect.

14. The method of claim 13, further including monitoring capacity of the third virtual path and the fourth virtual path using third and fourth hardware policers, respectively, in the first network device.

15. The method of claim 7, wherein the physical interconnect includes a cable or a network circuit and, in either case, the packet does not pass through the Internet when being transmitted between the first and second network devices.

16. A system, comprising:

a network device configured to receive a physical interconnect having a plurality of virtual paths associated therewith;

multiple hardware policers associated with each virtual path of the plurality of virtual paths, the multiple hardware policers for monitoring capacity usage of the plurality of virtual paths; and a loopback device in the network device for receiving a network packet on the physical interconnect on a first of the plurality of virtual paths and for transmitting the network packet back on the physical interconnect on a second of the plurality of virtual paths, wherein the network packet passes through first and second of the multiple hardware policers, associated with the first and second virtual paths, respectively.

17. The system of claim 16, wherein the multiple hardware policers and the loopback device are within an Integrated Circuit of the network device used for switching packets through the network device.

18. The system of claim 16, wherein the loopback device includes layer 2 hardware that monitors for a tag in the network packet and, if the tag indicates that the network packet is a test packet, bypasses the layer 3 hardware and rewrites the tag for the second virtual path.

19. The system of claim 16, wherein the loopback device includes layer 3 hardware that performs a lookup in a forwarding table and rewrites the tag for the second virtual path based on the lookup.

20. The system of claim 16, wherein the loopback device is an external cable coupled to two different ports on the network device.

* * * * *